United States Patent [19]

Kametani

[11] Patent Number: 4,870,608

[45] Date of Patent: Sep. 26, 1989

[54] METHOD AND APPARATUS FOR FLOATING POINT OPERATION

[75] Inventor: Masatsugu Kametani, Ibaraki, Japan

[73] Assignee: Hitachi, Ltd., Tokyo, Japan

[21] Appl. No.: 123,279

[22] Filed: Nov. 20, 1987

[30] Foreign Application Priority Data

Nov. 26, 1986 [JP] Japan .................................. 61-279587

[51] Int. Cl.$^4$ .............................................. G06F 7/38
[52] U.S. Cl. .................................................. 364/748
[58] Field of Search ........ 364/748, 736, 200 MS File, 364/723

[56] References Cited

U.S. PATENT DOCUMENTS

| | | | |
|---|---|---|---|
| 4,031,370 | 6/1977 | Catherall | 364/723 |
| 4,351,025 | 9/1982 | Hall, Jr. | 364/200 |
| 4,700,319 | 10/1987 | Steiner | 364/736 |

*Primary Examiner*—Gary V. Harkcom
*Assistant Examiner*—Long T. Nguyen
*Attorney, Agent, or Firm*—Antonelli, Terry & Wands

[57] ABSTRACT

Method and apparatus for floating point operation for calculating an approximate solution in a given argument of a function. An operation unit for carrying out floating point logical operation and floating point multiplication, a first memory for storing data necessary for operation and data produced in a course of operation, a second memory for storing a microprogram for controlling a process of operation of the operation unit, a micro-sequencer for issuing a control command necessary for the operation unit to carry out the operation, in accordance with the microprogram, a third memory for storing a table of solutions of coefficient functions in the series polynomial approximate equation of the function including a coefficient function consisting of numeric logic operation or multiplication operation, and an address latch for designating an address of the solution of the series expansion corresponding to the given argument of the function in the third memory are provided. When the function is instructed and the corresponding argument are given, the micro-sequencer calculates the address in the table of solution of the coefficient function corresponding to the argument, loads the calculated address to the address latch and reads the solution of the coefficient function from the table and supplies it to the operation unit. The operation unit calculates the solution of the given argument of the function based on the solution of the coefficient function read from the table, in accordance with the control command from the micro-sequencer.

9 Claims, 3 Drawing Sheets

METHOD AND APPARATUS FOR FLOATING POINT OPERATION

BACKGROUND OF THE INVENTION

The present invention relates to a numeric operation processor for providing various numeric operation functions, and more particularly to a floating point operation processor suitable for floating point addition, subtraction, multiplication and division and transcendental entire function operation.

"NIKKEI ELECTRONICS", July 14, 1986, No. 399, pages 171–185, published by Nikkei McGrow Hill (original English version thereof was published in "EDN", Jan. 9, 1986, by Cahners Publishing Corp. U.S.A.) shows a floating point operation processor having a high speed operation unit, a microsequencer (microprogram sequence controller), a register file and a data ROM (read-only memory). As shown in pages 179–185, a function operation uses a convergence equation for the function operation or an approximate equation by a series polynomial such as a Chebyshev approximation polynomial. The data ROM is a constant ROM of a small storage capacity for storing constants of the convergence equation or series polynomial for approximation.

Since this processor has only a small capacity constant data ROM, when a transcendental entire function is to be calculated, a classic series polynomial is iteratively operated on for an appropriate number of terms starting from an initial value to obtain a solution. In this case, coefficients of the series polynomial are stored in the constant data ROM. Basic operations to solve the function with a sufficient accuracy, that is, addition and multiplication require a large number of times of iteration of operation, and the execution time of the function operation is very long relative to the execution time of the basic operations. For example, in the above example, the number of steps of operation is several tens of steps and the function operation time of 3–10 microseconds is required even if the fastest ALU (arithmetic and logic unit) and multiplier (operation time: 100–150 ns) which are currently available as VLSI (very large scale integrated) devices are used. Accordingly, even if an existing expensive high speed operation coprocessor for a microprocessor is used, the cost-performance (performance/cost) attained in the addition, subtraction, and multiplication operations is not attainable in the function operation.

SUMMARY OF THE INVENTION

It is an object of the present invention to provide a method and apparatus for floating point operation in a microprogram control system which can provide as high a cost-performance as that attained in the performance of addition, subtraction and multiplication by an existing operation coprocessor for a microprocessor, in floating point function operation without using a high speed operation circuit or multiplier.

In order to achieve the above object, in accordance with the method of floating point operation of the present invention, when a function to be operated on and an argument thereof are instructed, a solution for the argument is obtained by a series polynomial approximate equation of the function. To this end, a large capacity memory is provided, and solutions of coefficient functions of the series polynomial approximate equation including coefficient functions consisting of simple numerical logical operation equations or multiplication equations are stored in the memory in a form of a table in a number sufficient to assure a required accuracy. As the number of types of functions to be operated on increases, the number of types of tables is increased accordingly. It is desirable from a standpoint of the operation speed that a table is provided for each group of series polynomials which constitute a series polynomial approximate equation. The floating point operation is executed under the control of the microsequencer in accordance with the microprogram. When a function f(X) to be operated on and a value of argument X are instructed from an external unit, the microsequencer reads a value of a coefficient function corresponding to the argument X from the table, and loads it into an operation unit (arithmetic logical unit or multiplier). This is iterated as many times as the number of coefficient functions. In accordance with the microprogram, the microsequencer commands the operation unit to solve a series polynomial approximate equations by using the loaded coefficient functions. The operation unit parallelly carries out simple additions or multiplications to obtain an approximate solution of the function f(X) for the argument X. More specifically, where X' is a neighborhood value of the argument X of the function f(X), f(X) is expressed by an n-th approximation $$\sum_{n=0}^{m} a_n(X') \cdot X^n$$

(for example, the Taylor polynomial is modified and rewritten) of the function f(X) having coefficient functions $a_n(X')$ represented only by X' as coefficients of respective terms, a table memory which stores values of $a_n(X')$ which can be looked up by X' is prepared, and an approximate solution $$\sum_{n=0}^{m} a_n(X') \cdot X^n$$

of f(X) is obtained based on $a_n(X')$ directly looked up from the table memory.

In this manner, it is possible to control the microprogram with a small number of simple basic operations and a small number of operation steps to carry out the function operation in the floating point operation unit. Accordingly, compared with the prior art system which obtains a solution by a convergence type iterative operation, the number of times of performance of basic operations can be reduced to one third (depending on the table resolution power) and the function operation time is significantly reduced accordingly.

By storing values of the terms for n=0~m of the coefficient function $a_n(X')$ in separate table memories and parallelly controlling the table memories by the microsequencer, the operation time is further saved.

By parallelly controlling the operation unit and the table memories by the microsequencer, the operation time is also reduced because the values of the coefficient functions can be read from the table memories during the execution of the operation.

DESCRIPTION OF THE PREFERRED EMBODIMENTS

Figure 1:
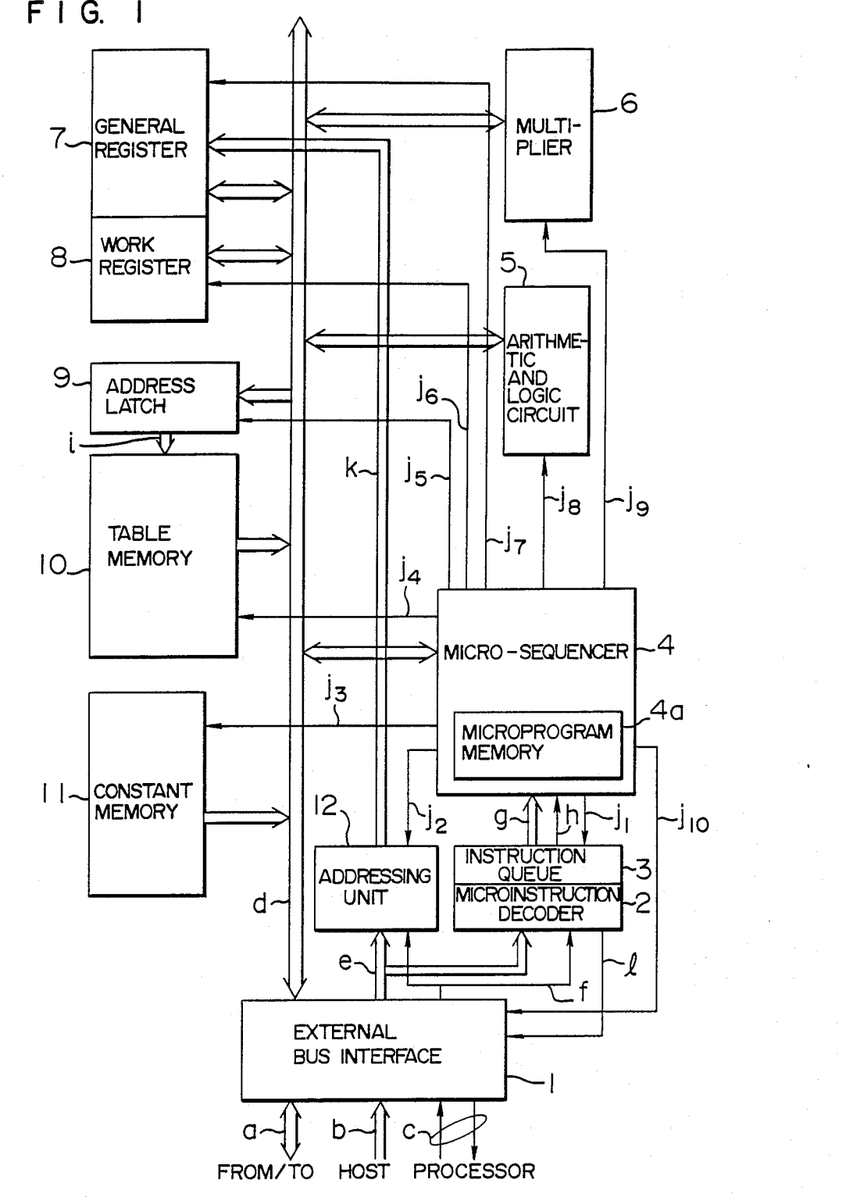
FIG. 1 shows a block diagram of one embodiment of a floating point operation unit of the present invention.

FIG. 1 shows a hardware block diagram of one embodiment of a floating point operation unit of the present invention. The present unit carries out a floating point operation based on a macro instruction from an external host processor (not shown) through an external bus interface 1 through which micro instruction, address information and control signals are exchanged with the host processor, and sends an operation result to the host processor.

The present unit basically comprises a control unit including blocks 1–4 and 12 and a peripheral unit including blocks 5–11. In the control unit, numeral 2 denotes a macro instruction decoder which decodes a macro instruction from the host processor and translates it to an internal instruction (execution start address of the microsequencer), numeral 3 denotes an instruction queue which temporarily stores the translated instruction until the execution of the preceding instruction is completed, numeral 4 denotes a microsequencer (microsequence controller) which receives the instruction from the instruction queue, sequentially reads instructions from a microprogram memory 4a in which a microprogram is stored, under the control of microinstruction, and controls the peripheral circuit through control lines $J_1$–$J_{10}$ in accordance with the process requested by the microinstruction, and numeral 12 denotes an addressing unit which analyzes the address information of registers supplied from the host processor to determine an addressing mode. The peripheral unit (5–11) is controlled through the control lines $J_3$–$J_9$ of the micro-sequencer 4. In the peripheral unit, numeral 5 denotes an arithmetic and logic circuit which has functions of floating point addition/subtraction, format transformation and some logical functions, numeral 6 denotes a multiplier which carries out floating point multiplication, numeral 7 denotes a general register file which stores an argument, numeral 8 denotes a work register which temporarily stores an interim result of the operation, numeral 10 denotes a large scale function ROM table memory which stores values of coefficient functions, in a form of table, of function curves, numeral 9 denotes an address latch which addresses the table memory 10, and numeral 11 denotes a constant memory which stores constant data such as coefficients which are commonly used in the operation. The control lines $J_1$–$J_{10}$ are connected to the control unit and the peripheral unit with a necessary number of lines, and each block in each unit is independently controllable by the micro-sequencer 4.

The units, and the floating point operation unit and the host processor are interconnected by data buses, address buses and control buses a–l (excluding j). The line a is a data bus from the host processor to the external bus interface 1, the line b is an address bus, the line c is a control bus, the line d is a bilateral data bus connecting the internal units, and the line k is an address bus for carrying addressing information of the general register file 7 generated by the addressing unit 12. The command from the host processor is modified by the external bus interface 1 and it is supplied to the addressing unit 12 and the instruction decoder 2 through the instruction/addressing bus e and the control bus f. The control lines $j_1$, $j_{10}$ and l are used to send acknowledge, ready and busy signals to the instruction queue 3 and the external bus interface 1.

The apparatus of the present invention is characterized by the provision of the large scale function table memory which the micro-sequencer 4 can directly access through the control line $j_4$ and the table memory address latch 9. The micro-sequencer 4 can directly instruct through the data bus d to set index value Nx corresponding to an argument X' determined with the operation results of the arithmetic and logic circuit 5, multiplier 6 and registers 7 and 8, into the address latch 9 without routing to other blocks. The address latch 9 can supply necessary table look-up information to the table memory 10 through the address line i.

Figure 2:
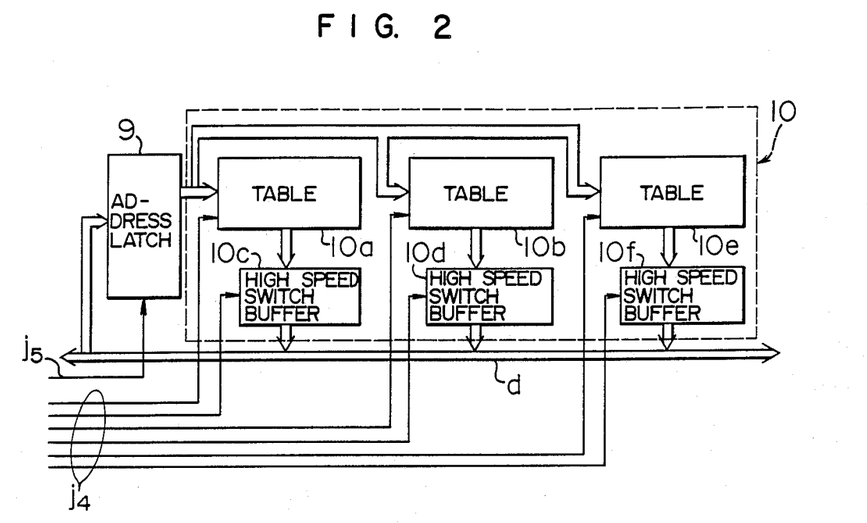
FIG. 2 shows a detailed diagram of an address latch and a table memory of FIG. 1.

FIG. 2 shows a block diagram of the address latch 9 and the table memory 10. The table memory 10 stores independently available coefficient function values of a function to be operated on into a plurality of independent table memories, respectively, and accesses one of them by one index information i. In FIG. 2, three different coefficient function values are stored in three table memories 10a, 10b and 10c, respectively. The table memory 10 may be an EPROM (Erasable Programmable Read Only Memory) having an access time of 150 ns and a capacity of 256 K bits, and may have 32 bits/data floating point format.

Since the coefficient tables of two to four functions can be stored in four 256 K ROM's, although resolution and accuracy may differ from function to function, the table memory 10 can be very inexpensively constructed. The table memories 10a, 10b and 10e have high speed switch buffers 10c, 10d and 10f, respectively. The high speed buffers 10c, 10d and 10f output the data of the coefficient functions from the memories 10a, 10b and 10c to the data bus d, independently from the access to the memories 10a, 10b and 10e. As a result, the access to the three table memories 10a, 10b and 10e can be parallelly carried out although the data bus d is a single channel. When the operation cycle time of the microsequencer 4 is 60 ns (f=16.67 MHz), the access time to the table memories 10a, 10b and 10e may be three clock periods, and the data input time from the high speed switch buffers 10c, 10d and 10f may be one clock period. When the table memories 10a, 10b and 10e and the corresponding high speed switch buffers 10c, 10d and 10f are parallelly driven, necessary data can be carried by the data bus d in three clock periods.

An approach to an approximate solution of a function by using a Taylor series is now explained.

F(X) is a function to be solved, X is an argument, and X' is a neighborhood value of the argument X.

The Taylor series of f(X) is given by $$\sum_{n=0}^{m} \frac{1}{n!} f^{(n)}(X') \cdot (X - X')^n \quad (1)$$

where $f^{(n)}(X')$ is an n-th differentiation of $f(x')$. The formula (1) is expressed by $$\sum_{n=0}^{m} a_n(X') \cdot X^n \quad (2)$$

and it is one-order approximated to get $$f(X) \approx a_0(X') + a_1(X') \cdot X \quad (3)$$

From the above Taylor expansion, we get $$\begin{aligned} f(X) &\approx f(X') + f'(X') \cdot (X - X') \\ &= f(X') - f'(X') \cdot X' + f'(X') \cdot X \end{aligned} \quad (4)$$

Therefore, $$a_0(X') = f(X') - f'(X') \cdot X' \quad (5)$$

$$a_1(X') = f'(X') \quad (6)$$

where $a_0(X')$ and $a_1(X')$ are coefficient functions of the function f(X). As many coefficient functions at the neighborhood value X' of X as is sufficient to assure the accuracy of the approximate solution are precalculated and stored in the table memory 10. In the operation of the function f(X), when the argument X is given, the value X' closest to the argument X is read from the register file, the address thereof is set into the address latch 9, the coefficient function of X' is read from the table memory 10 and loaded to the arithmetic and logic circuit 5 and the multiplier 6, and a Taylor series approximate solution of the function f(X) is calculated by floating point operation.

The operation for a function f(X)=SIN (X) is explained in detail. Since f(X)=SIN (X), f(X')=SIN (X'), f'(X')=COS (X') Therefore, from formulas $$a_0(X') = \text{SIN}(X') - \text{COS}(X') \cdot X' \quad (7)$$

$$a_1(X') = \text{COS}(X') \quad (8)$$

For example, $a_0(X')$ is stored in the table memory 10a and $a_1(X')$ is stored in the table memory 10b.

When X is loaded to the address latch 9, the address latch 9 multiplies a reciprocal of a minimum resolution power α of the table to X and produces an integer value $N_X$ thereof, or when X is loaded, the multiplier 6 carries out the multiplication and then $N_X$ is loaded to the address latch 9. In the present embodiment, $N_X$ is calculated in the latter method. The operation to calculate $N_X$ is as follows.

$$N_X = \text{INTEGER}(X \cdot 1/\alpha)$$

Since 1/α is a constant, it is read from the constant memory 11. The neighborhood value X' is $$X' = N_X \cdot \alpha$$

$N_X$ is loaded to the address latch 9 as the address of the table memories 10a and 10b. The address latch 9 latches $N_X$ by the instruction from the microsequencer 4 through the control line j5. The contents of the table memories 10a and 10b are set such that TROMa ($N_X$) and TROMb ($N_X$) which are outputs to the table memories 10a and 10b represent the coefficient values $a_0(X')$ and $a_1(X')$ corresponding to the neighborhood value X'. Namely, $$\text{TROMa}(N_X) = a_0(X') = \text{SIN}(X') - \text{COS}(X') \cdot X'$$

$$\text{TROMb}(N_X) = a_1(X') = \text{COS}(X')$$

In the actual operation, f(X)=SIN (X) is approximated from the formulas (4), (5) and (6) as follows.

$$f(X) \approx \text{TROMa}(N_X) + \text{TROMb}(N_X) \cdot X$$

The minimum resolution power α of the table is selected to a sufficiently small value so that the approximate equation has a sufficient accuracy. If the capacity of the table memory is short, a two-order approximation or higher order approximation is selected. In this manner, the capacities of the table memories 10a and 10b can be reduced.

Figure 3:
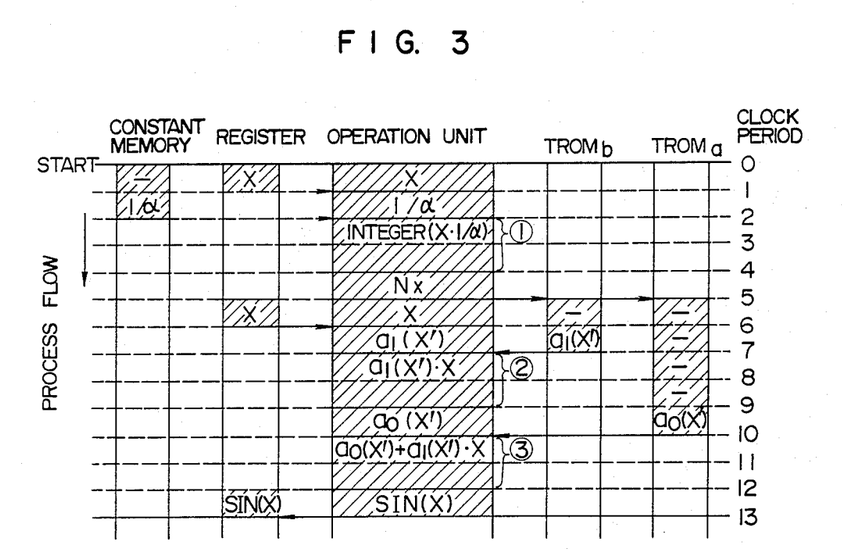
FIG. 3 shows a flow chart of an operation for SIN (X) in accordance with the present invention.

FIG. 3 shows a practical operation flow chart for determining the solution for SIN (X). The operation flow proceeds in the direction from the upper column to the lower column. The operation periods of component blocks are shown by the hatched area. The constant memory 11 and the table memory 10b storing coefficient functions $a_1(X')$ (TROMb) may be high speed ROMs, which are capable of being accessed in two-clock periods. The table memory 10a storing the coefficient function $a_0(X')$(TROMa) may be a low speed ROM which is capable of being accessed in five-clock periods. The arrows in the horizontal direction indicate data flow directions. It is assumed that the data transaction between the registers 7 and 8 and the operation unit can be carried out in one clock period, and basic arithmetic operation such as addition, subtraction and multiplication can be carried out in two clock periods, respectively. The clock periods are indicated by the number in the right column of the flow chart.

The explanation of the flow chart will be made with the operation unit (arithmetic and logic circuit 5 and multiplier 6) as the central block. At first, in clock period zero, a reading out of 1/α from the constant memory 11 starts, while the value of the argument X is called up from the register 7. In clock period 1, the value of X is loaded into the operation unit. In clock period 2, the value of 1/α is determined in the constant memory 11 and the value is loaded into the operation unit. The operation units (5, 6) calculate INTEGER(X·1/α) (① in FIG. 3) and output the result to the address latch 9 at clock period 4. The address latch 9 latches it at a clock period 5. At a clock period 6, X is again loaded from the register 7 to the operation unit. Since the output $a_1(X')$ of the table memory 10b is now determined, it is loaded into the operation unit at a clock period 7 and then the operation of $a_1(X') \cdot X$ (② in FIG. 3) is started. Since the output $a_0(X')$ of the low speed table memory 10a is now determined, it is loaded into the operation execution unit, and the result of the operation $a_1(X') \cdot X$ is added to $a_0(X')$ (③ in FIG. 3). A final function operation result SIN (X) is returned to the register file 7 at a clock period 13.

Since the operation unit, the table memories 10a and 10b and the constant memory 11 can be operated parallelly, the operation unit can be continuously operated so that the operation time can be reduced.

In the present example, the solution of the function SIN (X) is obtained in three basic operations, and the operation time is considerably reduced by a combinational effect of the reduction of operation time by the parallel processing.

When an approximate solution of two order or higher order approximation is used, for example, when the two order approximation is used, the function is modified to $$f(X) \approx a_0(X') + \{a_1(X') + a_2(X') \cdot X\} \cdot X$$

and $a_0(X')$, $a_1(X')$ and $a_2(X')$ are stored in the respective table memories and the operation is started from the values in the parentheses. Thus, the process is carried out by the iteration of the flow explained in conjunction with the one-order approximation. The number operations is always minimum.

Figure 4:
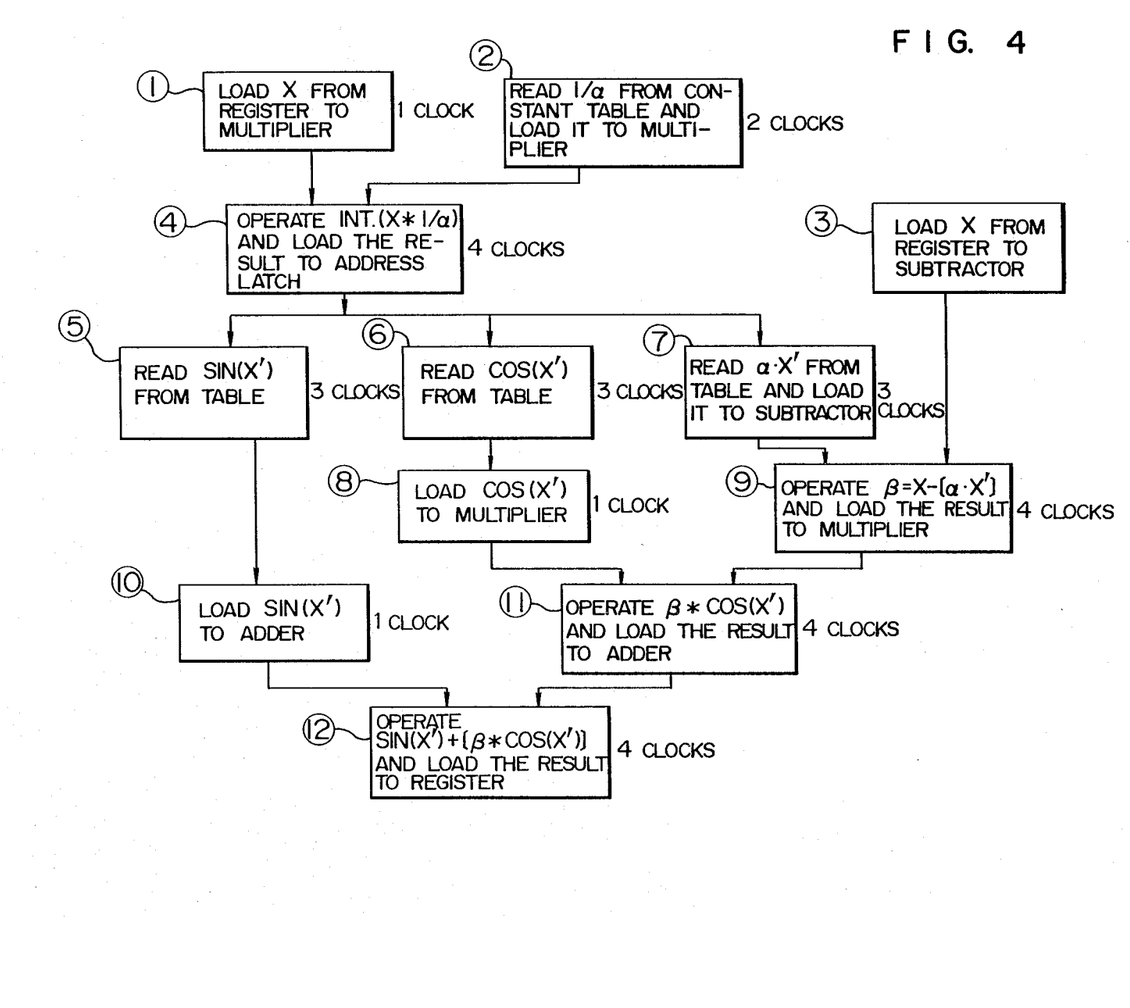
FIG. 4 shows a flow chart of another operation for SIN (X) in accordance with the present invention.
Figure 6:
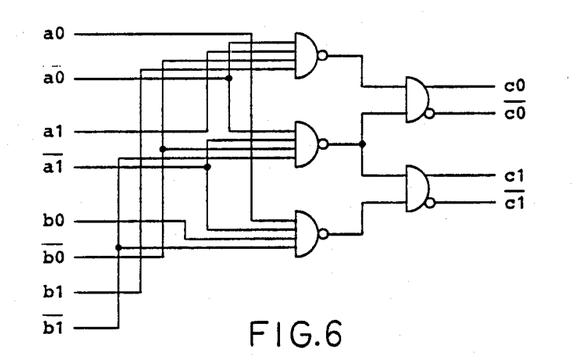
Figure 7:
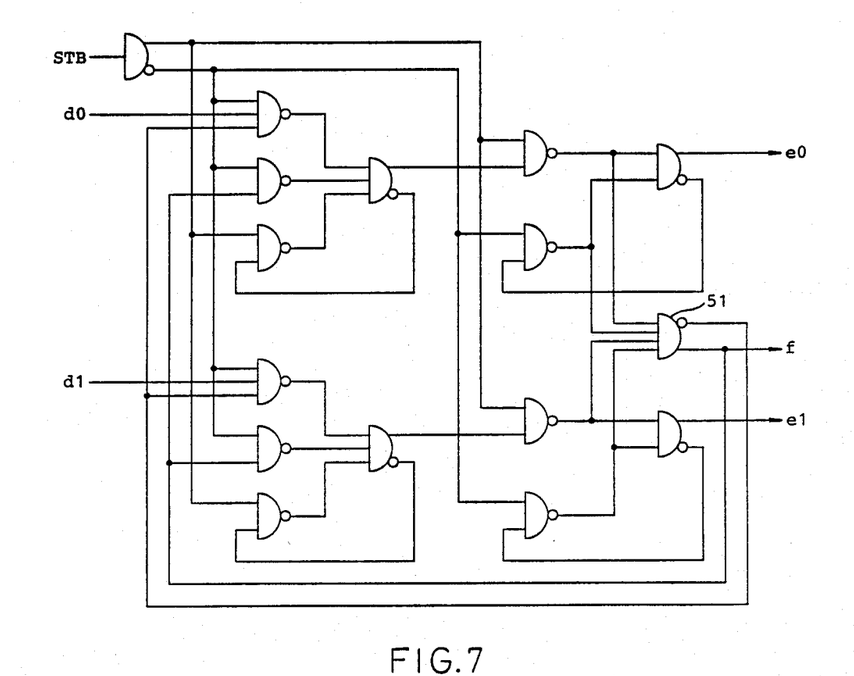
Figure 8:
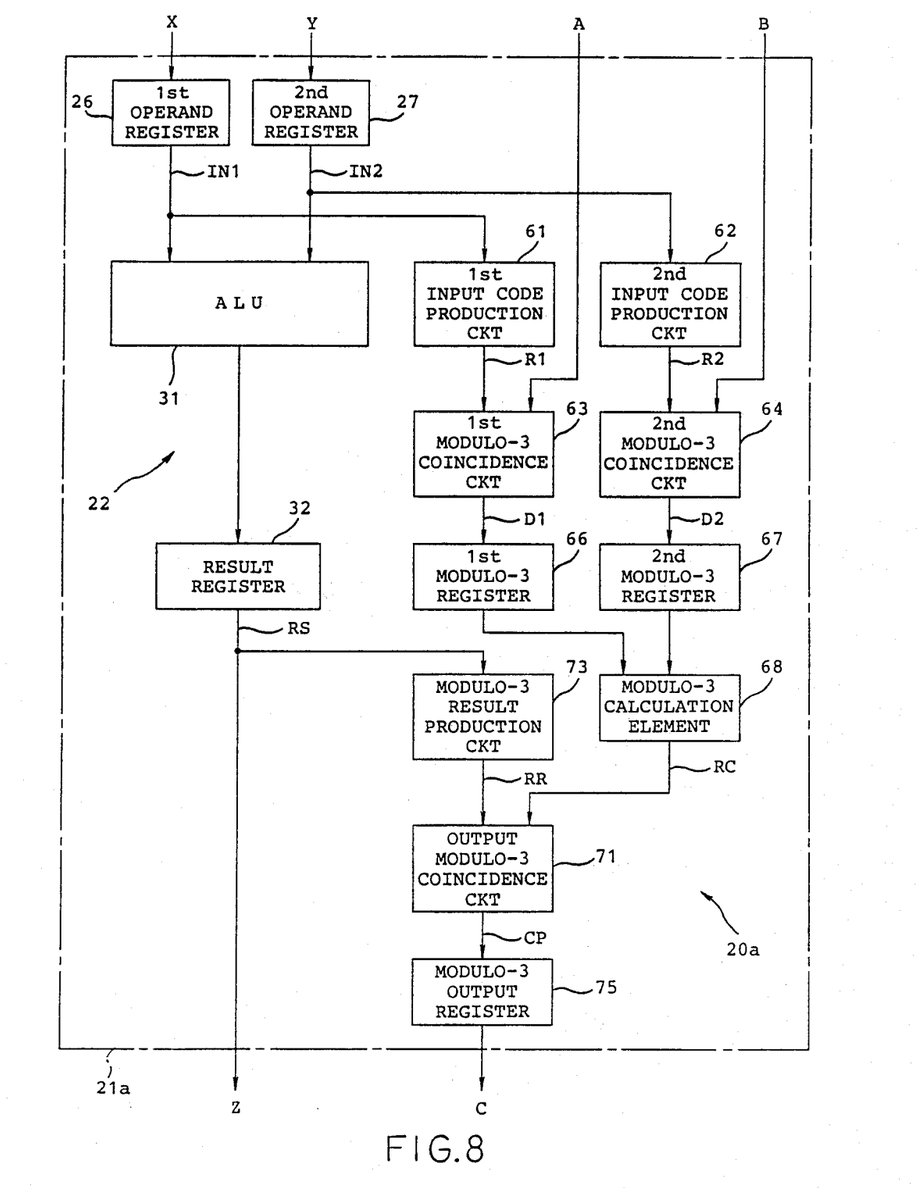
Figure 9:
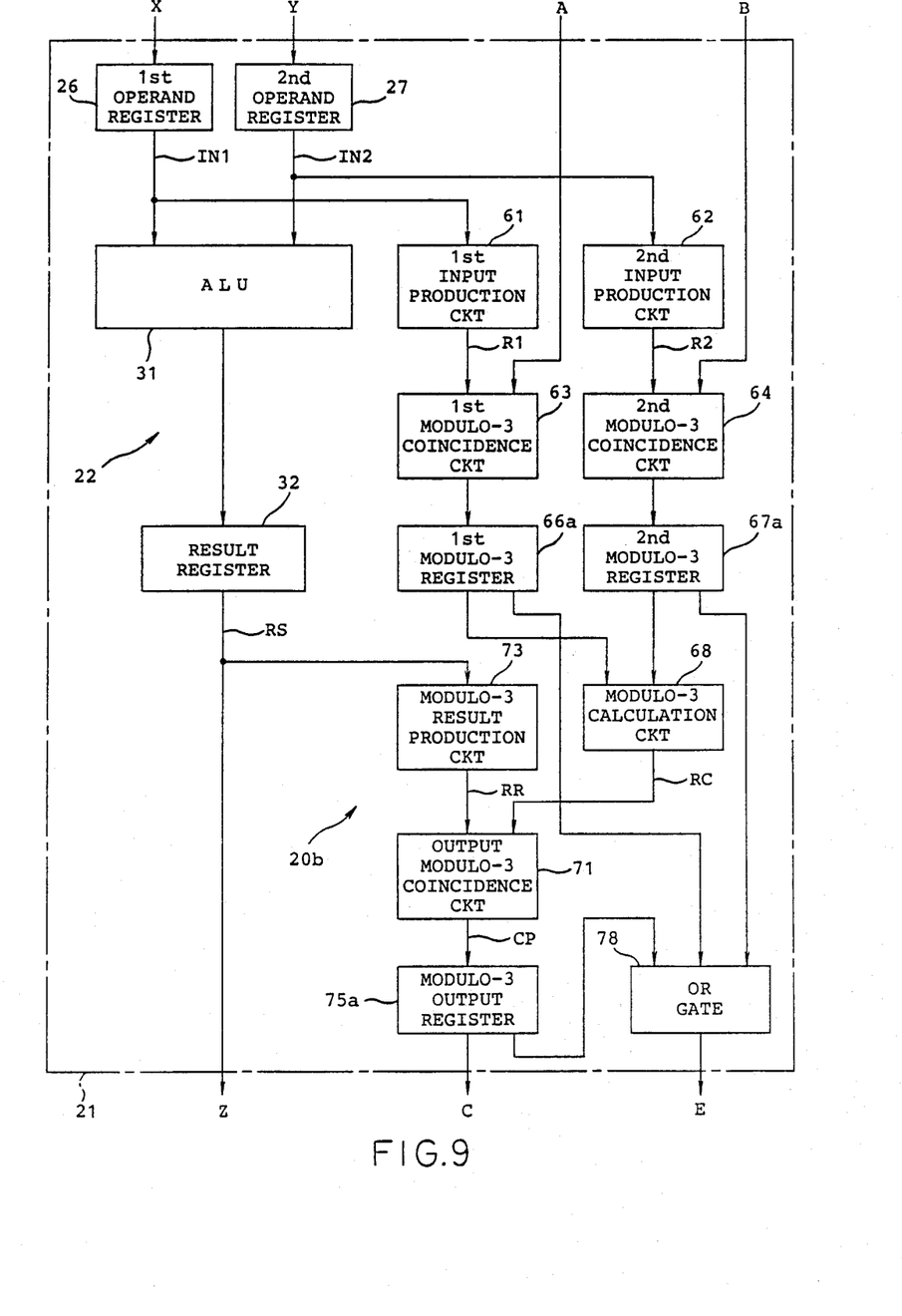

FIG. 4 shows another embodiment of an operation flow for solving the sine function by the present apparatus. Since the table memory 10 is of large capacity, an angle between 0–2π is divided into $2^{13}$ (8,192) areas so that one-order approximation of the Taylor series is carried out with a sufficient precision (as precise as the precision of 32-bit floating point).

The sine function is expressed as follows from the formulas (4)-(7).

$$\text{SIN}(X) \approx \text{SIN}(X') + \beta * \text{COS}(X') \qquad (8)$$

where $X' = \text{INTEGER}(X*1/\alpha) = N_X$

\* is a multiplication symbol $\beta = X - \alpha \cdot X' \alpha$ is a minimum interval of coefficient function values of the table The interval $\alpha$ of the function values and a reciprocal thereof are stored in the constant memory 11. The value $\alpha \cdot X'$ is considered as a function and stored in the table memory 10. The constant memory 11 may be an EPROM of a small capacity having an access time of 100 ns. Accordingly, it may be accessed in two clock periods (cycle time: 60 ns). In the flow shown in FIG. 4, operation numbers ①– ⑩ are designated in the order of completion of operation. The horizontally adjacent operations can be parallelly processed. The number of clock periods (at the cycle time of 60 ns) is shown at the right side of each operation.

The sine function SIN (X) of X is to be obtained by a one-order solution $$\text{SIN}(X') + \beta * (\text{COS}(X')) \qquad (8)$$

of /the Taylor series. $X'$ is a neighborhood value of X. Since it corresponds to the table index value $N_X$, SIN (X'), COS (X') and $\alpha \cdot X'$ function values are stored in a form of a table in the independent tables ROM 10a, 10b and 10e. In this case, X' may be INTEGER(X*1/α). INTEGER is a maximum integer not exceeding the argument. When a table having an angle 0–2π divided by $2^n$ is used, the table index value $N_x$ can be obtained by carrying out a floating point multiplication X*1/α and converting the product to a complement integer format. This format conversion is carried out by the operation unit (5, 6).

The operation flow is explained with reference to FIG. 4. It is assumed that the value X is in the general register 7, and it is loaded to the multiplier 6 in operation ① to use it as a first operand of the multiplication. In parallel thereto, a value 1/α is read out from the constant memory 11 and it is directly loaded to the multiplier 6 to use it as a second operand. In an operation ④, INTEGER(X*1/α) is calculated, and the result thereof is loaded to the address latch 9 in parallel with an operation ③ in which the value X is loaded to the subtractor in the arithmetic and logic unit 5 from the register 7 to use it as a first operand. The operation ④ basically comprises one multiplication. When a multiplication time is 240 ns, the operation is completed in four clock periods including one clock period for the store time to the address latch 9.

In this manner, the index information $N_X$ of the coefficient function table is obtained. Then, readout of a value corresponding to the index information from the table memory 10a which stores the value SIN (X') and the readout of necessary values from the table memory 10b which stores the value COS (X') and the table memory 10e which stores the value $\alpha \cdot X'$ are parallelly carried out (operations ⑤, ⑥ and ⑦). In the operation ⑦, the result is loaded to the subtractor in the arithmetic and logic circuit 5 to use it as a second operand. In the operations ⑤ and ⑥, the result is loaded in a later step in order to avoid conflict on the data bus and to give priority to the operation ⑦. In an operation ⑨, subtraction $X - (\alpha \cdot X')$ is carried out, and the result $\beta$ is loaded to the multiplier 6. In parallel thereto, the value COS (X') calculated in the operation ⑥ is loaded to the multiplier 6 in an operation ⑧. In an operation ⑪, multiplication $\beta * \text{COS}(X')$ is carried out, and in parallel thereto, the value SIN (X') calculated in the operation ⑤ is loaded to the adder in the arithmetic and logic circuit 5 in an operation ⑩. In an operation ⑫, addition SIN (X') + [β\*COS (X')] is carried out, and the result is returned to the general register 7. The addition and subtraction are carried out in 240 ns (4 clock periods) as is the multiplication operation. The above operations are carried out in the floating point including data. The data loaded to the address latch 9 is in complement integer format.

The operation of the sine function described above comprises one addition, one subtraction and two multiplications, and is completed in a very small number of operation steps. The total number of clock periods of the flow-through is 21 (one clock:60 ns, total of 1.26 μs). In the prior art convergence type iterative operation, the operation time is 2.5~3 μs including additional operations even if an arithmetic and logic unit of 120 ns speed (twice as high as the speed of the present embodiment) is used. In the coprocessor of the microprocessor, the fastest one carries out multiplication between registers in 3 μs and sine wave function in 23 μs. The present apparatus has 20 times as high cost-performance as that of the prior art coprocessor in the operation of the function. In the prior art system, it is 7-9 times higher even if the high speed arithmetic and logic unit is used.

The embodiments of the present invention offer the following advantages.

(1) Since a large capacity table memory which can be directly accessed by the micro-sequencer is provided, a one-order or two-order simple operation of the Taylor series can be performed at a high speed in a small number of steps by microprogramming control.

(2) All values including the content of the table memory are processed in floating point. Accordingly, no additional operation such as precision correction is required.

(3) The access of the table memory and the constant memory, the operation of the multiplier and the arithmetic and logic unit, and the movement of data are parallelly carried out. Accordingly, the memory access time is essentially reduced and the memory may be an inexpensive and low speed memory.

(4) When two or more coefficient function values are necessary for one function operation, as many independent coefficient function table memories as permitted from the standpoint of capacity are provided, and necessary data is parallelly looked up from the tables. Accordingly, effective memory access time is reduced and an inexpensive, low speed ROM may be used.

(5) Consequently, the cost performance of the function operation which was as high as 7-9 times of that of the coprocessor of the microprocessor with a high speed arithmetic and logic unit can be increased to 20 times.

I claim:

1. A floating point operation apparatus for calculating an approximate solution for an externally given argument of a function, said apparatus comprising:

means for performing arithmetic operation, numeric conversion and data transfer;

first memory means for storing data necessary for the arithmetic operation and data produced in a course of the arithmetic operation;

second memory means for storing a microprogram for controlling a process of the arithmetic operation of said operation means;

a micro-sequencer for issuing a control command necessary for said operation means to perform the arithmetic operation in accordance with the microprogram;

third memory means for storing a table of solutions of coefficient functions in a series polynomial approximate equation of said function;

an address latch for latching address information designating an address of a location storing the solution of the coefficient function corresponding to the given argument of said function in said table of said third memory means;

said micro-sequencer including means, responsive to the operation for said function being instructed and the corresponding argument being given, for calculating said address information of the location in said table storing the solution of the coefficient function corresponding to the argument, loading the calculated address information to said address latch, reading out the solution of the coefficient function from said table supplying the solution to said operation means; and said operation means including means for calculating said approximate solution for the given argument of said function based on the solution of the coefficient function read from said table in accordance with the control command of said microsequencer.

2. A floating point operation apparatus according to claim 1 wherein said third memory means stores said table in floating point format.

3. A floating point operation apparatus according to claim 2 wherein said microsequencer includes means for accessing said third memory means independently from and parallelly to the operation of said operation means and the access to said first memory means, whereby addition, subtraction, multiplication and division and data movement are carried out in parallel with the readout of the solution of the coefficient function from said third memory means.

4. A floating point operation apparatus according to claim 1 wherein the series polynomial approximate equation of said function comprises a plurality of different coefficient functions, said third memory means includes a plurality of independent memories and at least some of said different coefficient functions are stored in respective independent memories so that said microsequencer can parallelly and independently access said different coefficient functions in said memories.

5. A floating point operation apparatus according to claim 1 wherein the function is given by f(X), the series polynomial approximate equation is represented by an n-order approximate equation $$\sum_{n=0}^{m} a_n(X') \cdot X^n$$

(m and n are integers) having a coefficient function $a_n(X')$ represented as a function of only a neighborhood value $X'$ of the argument X, said coefficient function $a_n(X')$ being a coefficient of each term of said n-order approximate equation, said third memory means including means for storing $a_n(X')$ as the coefficient corresponding to the value $X'$, and said operation means includes means for calculating the n-order approximate value by using the value $a_n(X')$ read from said table to calculate the approximate solution of the function f(X).

6. A floating point operation apparatus according to claim 5 wherein said micro-sequencer has independent control lines to said operation means and said third memory means so that said micro-sequencer can parallelly control the operation of said operation means and the access to said third memory means.

7. A floating point operation apparatus according to claim 5 wherein the plurality of different coefficient functions $a_n(X')$ which can be operated in parallel are stored in separate and independent memories included in said third memory means, and said micro-sequencer has independent control lines to said separate memories to individually control the access to said memories.

8. A method for floating point operation for calculating an approximate solution for a given argument of a function in accordance with a microprogram, said method comprising the steps of:

storing in a memory solutions of coefficient functions of a series polynomial approximate equation, said coefficient functions including coefficient functions having proper solutions corresponding to respective arguments to be given, said memory storing solutions corresponding to all of the arguments to be given;

reading from said memory a solution of the coefficient function corresponding to the argument of said function; and carrying out a floating point operation of the series polynomial approximate equation based on the solution read from said memory to calculate said approximate solution.

9. A method for floating point operation according to claim 8 wherein the function is given by f(X), the series polynomial approximate equation is represented by an n-order approximate equation $$\sum_{n=0}^{m} a_n(X') \cdot X^n$$

(n and m are integers) having coefficient functions $a_n(X')$ each represented as a function of only a neighborhood value $X'$ of the argument X, the coefficient function comprises a plurality of different coefficient functions, said step of storing in said memory including storing some of the different coefficient functions into independent memories, respectively, in a form of coefficient function values corresponding to the neighborhood value $X'$ of the argument X, and said step of reading the coefficient function is carried out parallelly to the memories storing the different coefficient function values.

* * * * *